UNITED STATES PATENT OFFICE.

CHARLES CASSTEEL, OF ST. LOUIS, MISSOURI, ASSIGNOR TO THE CINCINNATI MORTAR MANUFACTURING AND BUILDERS' SUPPLY COMPANY, OF CINCINNATI, OHIO.

PLASTER.

SPECIFICATION forming part of Letters Patent No. 478,951, dated July 12, 1892.

Application filed October 12, 1891. Serial No. 408,505. (No specimens.)

*To all whom it may concern:*

Be it known that I, CHARLES CASSTEEL, a citizen of the United States, and a resident of the city of St. Louis, in the State of Missouri, have invented a new and useful Plaster, of which the following is a specification.

My invention consists in a new combination of ingredients to form a plaster or artificial stone. The essential ingredients thereof are lime, gypsum, and coke or brick-dust with enough water to work the mixture properly. The proportions of the ingredients are variable within limits; but the preferable proportions are two-thirds, by volume, of lime; two-ninths, by volume, of gypsum, and about one-ninth, by volume, of coke or brick-dust. These ingredients should be pulverized or finely granulated and then thoroughly mixed together. After being thus mixed as much water is poured on as is necessary to unite chemically with the lime and gypsum and make the mixture plastic. This wet mixture is "dead"—that is, it sets or hardens too quickly to allow an operator time to spread it properly. In order to retard this setting or hardening sufficiently to give the operator time to work properly, a small proportion of a mixture of sugar, alum, and lime is put into the larger mixture before the water is added. This second mixture is only for convenience in working the plastic material and has no prominent effect on the finished plaster. Its retarding effect varies somewhat with the proportion in which it is used, the preferable proportion being six (6) pounds of this mixture to a thousand pounds of the dry main mixture.

It is preferable in practice to use along with the essential ingredients some cheap ingredient as a filling material that will add to the mass or body of the plaster without seriously injuring the advantages secured by their use alone. Sand, sawdust, marble-dust, and kaolin are all suitable for this purpose and may be used singly or together. The quantity to be used is a matter of judgment, the effect varying in degree with the quantity. For a face coat or work exposed to view this body or filler should be pulverized; but for a base or under coat the body or filling may be coarse. Any ordinary plaster may be used for the base or under coat, as my new plaster adheres to it quite strongly. All the ingredients, including the retarding mixture and the filler, are mixed before the water is poured on. The wet mixture is plastic and is spread on the wall or elsewhere when in this wet plastic condition. When it is spread evenly and partially hardened, a cloth or other suitable wiper or rubber is rubbed over the surface, giving it considerable polish.

Coke or brick-dust may be used either separately or together in the mixture. When either is used alone, its quantity should be, as before stated, about one-ninth of the volume of the essential ingredients. When both are used in the same plaster, they should together be one-ninth of said volume; but the proportion of each, when both are used, is merely a matter of judgment as to the color desired. Either alone or both together have a like effect, except as to color. Coke alone results in a plaster of a grayish blue. Brick-dust gives a pink tinge. When both are used, the color depends on the proportion of each. Any suitable coloring-matter may be added to the mixture—such, for instance, as marble-dust—which also serves as a filler.

The plaster when dry is very hard and durable and has a brilliant polished surface and is unaffected by exposure to air and water. It is especially adapted for use as a wall-plaster, as it has a beautiful appearance and may be washed and cleaned. I also contemplate using it for making tiles and in other ways.

What I claim as new, and desire to secure by Letters Patent, is—

1. A composition consisting of water, lime, gypsum, and coke, substantially as described.

2. A composition consisting of water, lime, gypsum, and coke, and a mixture of lime, alum, and sugar, in the proportions specified.

3. A composition consisting of water, lime, gypsum, and coke, and a filling material, as and in the proportions specified.

4. A composition consisting of water, lime, gypsum, and coke, a mixture of sugar, alum, and lime, and a filling material, as and in the proportions specified.

5. A composition consisting of water, lime, gypsum, coke, and brick-dust, in the proportions specified.

CHARLES CASSTEEL.

Witnesses:
W. REED CARRADINE,
JAMES C. JONES.